(No Model.)
T. WILLIAMS, Jr.
MEAT CUTTER.
No. 512,528.   Patented Jan. 9, 1894.
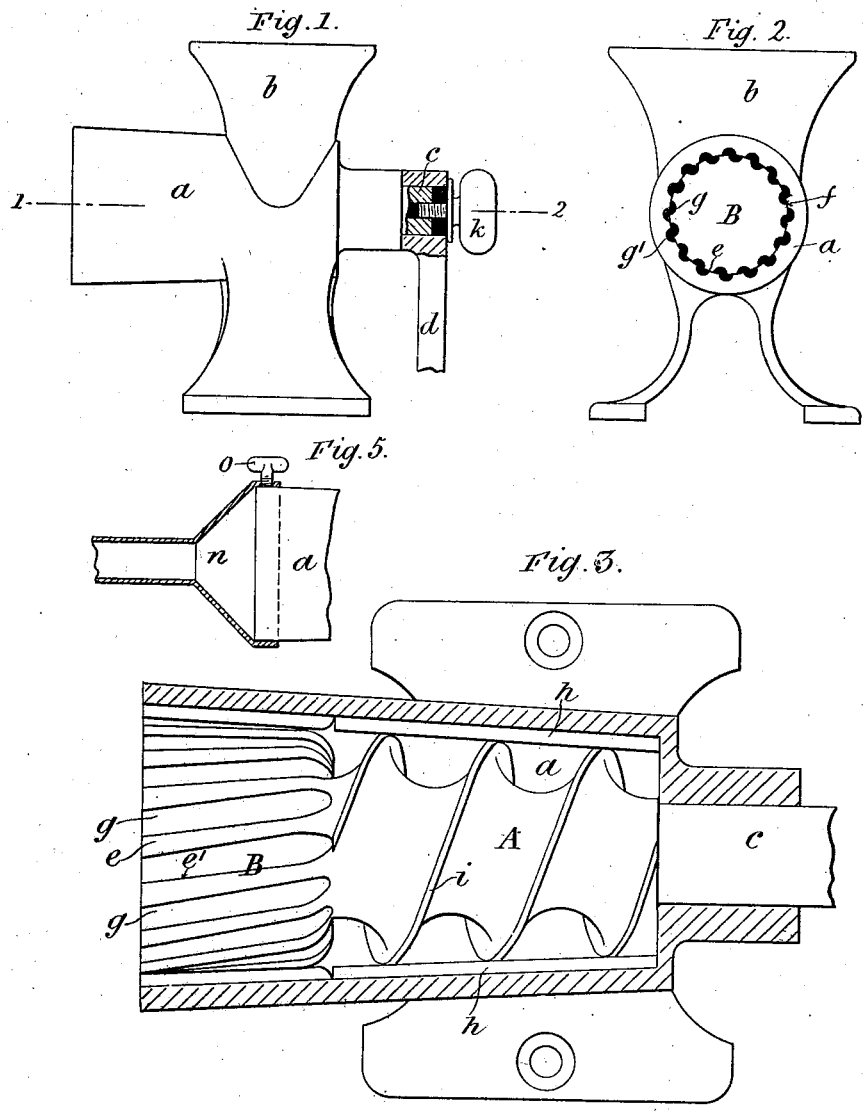
Witnesses.
E. R. Bolton
E. H. Sturtevant
Inventor:
Thomas Williams Jr.
By Richards
his Attorneys.

UNITED STATES PATENT OFFICE.

THOMAS WILLIAMS, JR., OF LONDON, ENGLAND.

MEAT-CUTTER.

SPECIFICATION forming part of Letters Patent No. 512,528, dated January 9, 1894.

Application filed May 31, 1893. Serial No. 476,038. (No model.) Patented in England January 9, 1892, No. 485, and in Germany July 12, 1892, No. 68,226.

*To all whom it may concern:*

Be it known that I, THOMAS WILLIAMS, Jr., engineer, a subject of Her Majesty the Queen of Great Britain and Ireland, residing at Bay Tree Cottage, Church End, Finckley, London, in the county of Middlesex, England, have invented new and useful Improvements in Meat-Cutters, (for which I have obtained a patent in Great Britain, dated January 9, 1892, No. 485, and in Germany, dated July 12, 1892, No. 68,226,) of which the following is a specification.

This invention relates to improvements in meat cutters of that type wherein the cutting up of the meat is effected solely between ribs formed around the interior of the sides of the casing and peripheral cutting devices rotating within such casing, In addition to simplicity and economy of construction, the object of my invention is, first, to render such machines quicker and more efficient in action; second, to leave as little residue as possible within the casing after the cutting up has been effected, thereby avoiding waste. I attain these results by the construction and arrangement of meat cutter hereinafter described, an essential feature of which consists in presenting an unobstructed path or channel for the passage of the meat from its entry at the hopper to its delivery in a cut up condition from the exit end of the casing. According to my invention I employ a casing the interior of which enlarges gradually from the hopper toward the outlet end. Within the outlet or larger end of the casing I place a peripheral cutter, consisting of a rotatable cylindrical core, provided around its periphery with a number of projecting cutting ribs, set at a slight angle to, and maintained in cutting contact with, similar cutting ribs formed around the interior of the outlet end of the casing, and extending in a longitudinal or approximately longitudinal direction. The ribs of the casing and of the peripheral cutter being set at an angle to one another, a scissors like cut is imparted to any substance passed between them. The meat is fed up to and forced between the cutting ribs by means of a forcing screw situated beneath the hopper, the thread of which terminates at and does not intersect the cutting ribs, thereby leaving the grooves or channels between such ribs unobstructed for the passage of the meat. The said peripheral cutter may either be cast in one with the core of the forcing screw, or constructed separately and secured upon the axis thereof. The peripheral cutter and forcing screw are of corresponding taper with the interior of the casing, and proper adjustment between the cutting ribs of the casing and those of the rotating peripheral cutter may consequently be readily effected by moving the said cutter longitudinally within the casing by any convenient arrangement. A simple method will be hereinafter described with reference to the drawings.

In the accompanying drawings in which similar letters refer to corresponding parts in all the views:—Figure 1, is a front elevation of my machine. Fig. 2, is an end elevation looking from the left of Fig. 1. Fig. 3, is an enlarged horizontal section of the case on line 1—2 Fig. 1, the combined forcer and cutter being shown in position. Fig. 4, is a horizontal section of the casing on line 1—2 Fig. 1, showing the cutting and feeding ribs therein. Fig. 5 is a detail view.

$a$ is the casing the interior of which enlarges gradually from the hopper $b$ to the outlet.

A is the forcing screw, upon the axis $c$ of which is mounted the crank $d$.

B is the peripheral cutter here shown as cast in one piece with the forcing screw A, but if desired it may be constructed separately and secured upon the axis thereof. This cutter B consists of a cylindrical core around the periphery of which are formed the cutting ribs $e$ the sharp edges $e'$ of which coact with the sharp edges $f'$ of the cutting ribs $f$ formed around the interior of the outlet end of the casing $a$. Between the cutting ribs $e$ and $f$ of the cutter and casing respectively, are left the unobstructed grooves or channels $g\ g'$. I prefer that these grooves or channels $g\ g'$ should gradually diminish in depth and width toward their outlet ends so as to keep the meat under the action of the cutters until properly cut. I also prefer to bevel or slightly round off the inner ends of the ribs $e$ and $f$ so as to facilitate the entrance of the meat into the grooves or channels $g\ g'$.

$h$ $h$ are longitudinal feeding ribs within the casing $a$ which coact with the thread or worm $i$ of the forcing screw A and prevent the meat from simply revolving with the latter.

It will be seen on referring to the drawings that the feeding and cutting devices are kept quite distinct the feeding ribs $h$ and spirals $i$ terminating when they reach the cutting ribs $f$ $e$. I consequently avoid all obstruction to the passage of the meat through the machine as is the case in some machines where the feeding and cutting ribs are caused to intersect one another, and I present an unobstructed path or channel for the passage of the meat from its entry at the hopper to its exit.

I effect the proper adjustment between the cutting ribs $e$ and $f$ by means of the thumb screw $k$ screwed into the end of the axis $c$ of the forcing screw. This thumb screw bears with its head upon and holds in place the crank $d$ and upon being tightened up draws the forcing screw and peripheral cutter toward the rear of the casing thereby taking up any wear that may have occured between the cutting ribs $e$ and $f$.

The action of the machine is as follows:—
The meat introduced by the hopper $b$ is carried forward by the forcing screw A and forced into and through the grooves or channels $g$ $g'$ between the cutting ribs $e$ and $f$, receiving during its passage a succession of shear like cuts from such ribs.

When it is desired to use the machine for filling also I may provide the casing with a convenient filling nozzle and pipe as shown in Fig. 5 where $n$ represents a filling pipe and nozzle secured to the casing $a$ by a convenient screw $o$.

The machine may be caused to cut either coarse or fine as desired by varying the size of the channels $g$ $g'$ between the cutting ribs $e$ and $f$, making them larger for coarse cut, and smaller for fine cut meat, or, when a filling nozzle and pipe are employed, by increasing or diminishing the bore of the pipe. The fineness of the cut may also be regulated by the length of the cutters. I find however that as a general rule a length of cutter approximately the same as one diameter of the cutting device at its largest end answers best.

What I claim, and desire to secure by Letters Patent of the United States, is—

1. In combination, the casing, the feed screw, the cutter at the forward end of the feed screw and the forcing and cutting ribs arranged on the interior of the cylinder and opposite the feed screw and cutter respectively said ribs extending longitudinally of the casing substantially as described.

2. A meat cutter constructed with a casing, cutting ribs formed round the interior of the outlet end thereof, a peripheral cutter acting in conjunction with the cutting ribs of the casing and consisting of a rotatable core provided around its periphery with cutting ribs having between them unobstructed grooves or channels, and forcing ribs extending up to and terminating at the cutting ribs, all of said ribs extending approximately longitudinally of the casing substantially as and for the purpose specified.

3. In a meat cutter, in combination, a casing enlarging gradually toward its outlet end, cutting ribs formed around the interior of such outlet end, a peripheral cutter as above set forth rotating in cutting contact with said cutting ribs, a forcing screw extending up to and terminating at the peripheral cutter, and means for adjusting the screw and cutter toward the smaller end of the case for effecting the adjustment between the cutting ribs of the casing and peripheral cutter substantially as described.

4. In a meat cutter in combination with cutting ribs around the interior of the outlet end of the casing and running in a longitudinal or approximately longitudinal direction a peripheral cutter consisting of a rotatable cylindrical core provided around its periphery with cutting ribs set at a slight angle or inclination to the cutting ribs on the casing, and having between them unobstructed grooves or channels, the forcing screw and the forcing ribs extending longitudinally of the casing and forming continuations of the channels between the cutting ribs substantially as described and illustrated.

5. The combination with the cutting ribs $f$ around the delivery end of the casing $a$ of the rotating cutter B provided around its periphery with the cutting ribs $e$ having between them unobstructed channels $g$ contracting toward their outlet ends, substantially as described and illustrated.

6. The combination of the casing $a$ enlarging gradually toward its outlet, cutting ribs $f$ around the outlet end thereof, peripheral cutter B, forcing screw A and adjusting nut $k$ arranged at the smaller end of the casing to draw the cutter and feed screw toward said smaller end substantially as described and illustrated.

In witness whereof I have signed my name in the presence of two subscribing witnesses.

THOMAS WILLIAMS, JUNR.

Witnesses:
A. E. ALEXANDER,
*Chartered Patent Agent*, 19 *Southampton Bldgs., London, W. C.*
J. BURGESS,
*Clerk to above.*